(12) United States Patent
Khan et al.

(10) Patent No.: US 12,293,183 B2
(45) Date of Patent: May 6, 2025

(54) CLIENT-SIDE ENRICHMENT AND TRANSFORMATION VIA DYNAMIC LOGIC FOR ANALYTICS

(71) Applicant: Twilio Inc., San Francisco, CA (US)

(72) Inventors: Osama Khan, Vancouver (CA); Brandon Sneed, Oregon City, OR (US); Mark Hazlett, North Vancouver (CA); Prateek Srivastava, Vancouver (CA); Chris Sperandio, San Francisco, CA (US); Ilya Volodarsky, San Francisco, CA (US); Tony Xiao, San Francisco, CA (US); Fathy Boundjadj, Villeneuve-sur-Lot (FR); Peter Richmond, Sunnyvale, CA (US)

(73) Assignee: Twilio Inc., San Francisco, CA (US)

(*) Notice: Subject to any disclaimer, the term of this patent is extended or adjusted under 35 U.S.C. 154(b) by 0 days.

(21) Appl. No.: 17/662,759

(22) Filed: May 10, 2022

(65) Prior Publication Data

US 2022/0269505 A1    Aug. 25, 2022

Related U.S. Application Data

(63) Continuation of application No. 16/921,690, filed on Jul. 6, 2020, which is a continuation of application No. 16/912,668, filed on Jun. 25, 2020.

(51) Int. Cl.
G06F 8/76 (2018.01)
G06F 8/33 (2018.01)
(Continued)

(52) U.S. Cl.
CPC .............. *G06F 8/76* (2013.01); *G06F 8/33* (2013.01); *G06F 8/60* (2013.01); *G06F 9/547* (2013.01);
(Continued)

(58) Field of Classification Search
None
See application file for complete search history.

(56) References Cited

U.S. PATENT DOCUMENTS 8,997,081 B1    3/2015    Manion et al.
9,159,035 B1    10/2015    Ismael et al.
(Continued)

OTHER PUBLICATIONS

D. da Silva, J. Costa, B. Assunção, V. Kuprych and C. Teixeira, "Microservice-based Middleware for Collaborative Supply Chain Tracing," 2020 15th Iberian Conference on Information Systems and Technologies (CISTI), Seville, Spain, 2020, pp. 1-6. (Year: 2020).*

(Continued)

*Primary Examiner* — Andrew M. Lyons
(74) *Attorney, Agent, or Firm* — Schwegman Lundberg & Woessner, P.A.

(57) ABSTRACT

Described are systems and methods for client side enrichment and transform via dynamic logic for analytics across various platforms for improved performance, features, and uses. Analytics data collected in client applications is transformed and enriched before being sent to the downstream pipeline using native code and logic bundled into the core application code. The additional logic specific to manipulation of analytics may be unbundled from client-side application code and still be executed on on-device to achieve the same result. The logic may be written in a single language, such as JavaScript, and run across all clients including web browser and mobile operating systems.

20 Claims, 12 Drawing Sheets

(51) Int. Cl.
*G06F 8/60* (2018.01)
*G06F 9/54* (2006.01)
*G06F 11/36* (2006.01)
*G06F 11/3604* (2025.01)
*G06F 11/362* (2025.01)
*G06F 21/62* (2013.01)

(52) U.S. Cl.
CPC ...... *G06F 11/3612* (2013.01); *G06F 11/3624* (2013.01); *G06F 11/3644* (2013.01); *G06F 11/366* (2013.01); *G06F 21/6254* (2013.01)

(56) References Cited

U.S. PATENT DOCUMENTS

| | | | |
|---|---|---|---|
| 9,626,277 | B2 | 4/2017 | Thangamani et al. |
| 9,893,972 | B1 | 2/2018 | Olson et al. |
| 10,474,563 | B1 | 11/2019 | Rai et al. |
| 12,067,393 | B2 | 8/2024 | Khan et al. |
| 2005/0005259 | A1 | 1/2005 | Avery et al. |
| 2005/0125251 | A1 | 6/2005 | Berger et al. |
| 2006/0140154 | A1* | 6/2006 | Kwak .................. H04W 52/56 370/335 |
| 2007/0180490 | A1 | 8/2007 | Renzi et al. |
| 2009/0113087 | A1* | 4/2009 | Kohinata ........... H04N 21/4147 710/60 |
| 2011/0131269 | A1* | 6/2011 | Gilleland ....... G06Q 10/06311 709/224 |
| 2011/0289524 | A1* | 11/2011 | Toner ............... H04N 21/44204 725/9 |
| 2013/0055205 | A1 | 2/2013 | Sereni et al. |
| 2013/0124669 | A1* | 5/2013 | Anderson ............. G06F 11/301 709/224 |
| 2013/0139179 | A1* | 5/2013 | Roll ..................... G06F 11/079 719/318 |
| 2013/0227352 | A1 | 8/2013 | Kumarasamy et al. |
| 2013/0273901 | A1* | 10/2013 | Calo ....................... H04W 4/00 709/202 |
| 2015/0026687 | A1* | 1/2015 | Yim .................... G06F 11/3072 718/102 |
| 2016/0182628 | A1 | 6/2016 | Chen et al. |
| 2016/0299829 | A1 | 10/2016 | Wei et al. |
| 2016/0321035 | A1 | 11/2016 | Shi et al. |
| 2017/0019489 | A1* | 1/2017 | Churchill ........... G06Q 30/0201 |
| 2017/0213132 | A1 | 7/2017 | Hammond et al. |
| 2017/0295206 | A1 | 10/2017 | Feiertag et al. |
| 2018/0007153 | A1* | 1/2018 | Fluehr ................. G06F 11/3466 |
| 2018/0060217 | A1 | 3/2018 | Yemini et al. |
| 2018/0189164 | A1 | 7/2018 | Kulkarni et al. |
| 2018/0253373 | A1 | 9/2018 | Mathur |
| 2018/0285247 | A1 | 10/2018 | Gandhi et al. |
| 2019/0124118 | A1 | 4/2019 | Swafford |
| 2019/0320038 | A1* | 10/2019 | Walsh .................... H04L 67/10 |
| 2019/0391901 | A1 | 12/2019 | Gupta et al. |
| 2020/0150953 | A1 | 5/2020 | Smith et al. |
| 2020/0364588 | A1 | 11/2020 | Knox |
| 2021/0026751 | A1 | 1/2021 | Larkin et al. |
| 2021/0406002 | A1 | 12/2021 | Khan et al. |
| 2021/0406150 | A1 | 12/2021 | Sneed et al. |
| 2022/0075875 | A1* | 3/2022 | Rioux ................. G06F 9/44526 |
| 2022/0075876 | A1 | 3/2022 | Rioux et al. |
| 2022/0269504 | A1 | 8/2022 | Khan et al. |

OTHER PUBLICATIONS

U.S. Appl. No. 16/912,668, filed Jun. 25, 2020, Application Instrumentation and Event Tracking.
U.S. Appl. No. 16/921,690, filed Jul. 6, 2020, Client-Side Enrichment and Transformation Via Dynamic Logic for Analytics.
"U.S. Appl. No. 16/912,668, Non Final Office Action mailed Oct. 27, 2022", 78 pgs.
"U.S. Appl. No. 17/662,751, Non Final Office Action mailed Nov. 10, 2022", 28 pgs.
"U.S. Appl. No. 16/921,690, Non Final Office Action mailed Dec. 8, 2022", 37 pgs.
"U.S. Appl. No. 16/912,668, Examiner Interview Summary mailed Feb. 9, 2023", 2 pgs.
"U.S. Appl. No. 16/921,690, Examiner Interview Summary mailed Feb. 9, 2023", 2 pgs.
"U.S. Appl. No. 17/662,751, Examiner Interview Summary mailed Feb. 9, 2023", 2 pgs.
"U.S. Appl. No. 16/921,690, Examiner Interview Summary mailed Sep. 8, 2023", 2 pgs.
"U.S. Appl. No. 16/921,690, Response filed Sep. 8, 2023 to Final Office Action mailed Jun. 8, 2023", 10 pgs.
"U.S. Appl. No. 17/662,751, Response filed Sep. 22, 2023 to Final Office Action mailed Jun. 22, 2023", 10 pgs.
"U.S. Appl. No. 16/921,690, Non Final Office Action mailed Sep. 27, 2023", 39 pgs.
"U.S. Appl. No. 17/662,751, Non Final Office Action mailed Oct. 4, 2023", 33 pgs.
"U.S. Appl. No. 16/912,668, Response filed Oct. 6, 2023 to Final Office Action mailed Jul. 6, 2023", 18 pgs.
"U.S. Appl. No. 16/912,668, Non Final Office Action mailed Oct. 26, 2023", 82 pgs.
"U.S. Appl. No. 16/921,690, Response filed Mar. 6, 2023 to Non Final Office Action mailed Dec. 8, 2022", 11 pgs.
"U.S. Appl. No. 17/662,751, Response filed Mar. 8, 2023 to Non Final Office Action mailed Nov. 10, 2022", 10 pgs.
"U.S. Appl. No. 16/912,668, Response filed Mar. 27, 2023 to Non Final Office Action mailed Oct. 27, 2022", 15 pgs.
"U.S. Appl. No. 16/921,690, Final Office Action mailed Jun. 8, 2023", 38 pgs.
"U.S. Appl. No. 17/662,751, Final Office Action mailed Jun. 22, 2023", 31 pgs.
"U.S. Appl. No. 16 912,668, Final Office Action mailed Jul. 6, 2023", 80 pgs.
"U.S. Appl. No. 16/912,668, Appeal Brief filed Sep. 26, 2024", 22 pgs.
"U.S. Appl. No. 17/662,751, Notice of Allowance mailed Sep. 28, 2024", 16 pgs.
"U.S. Appl. No. 17/662,751, Response filed Aug. 26, 2024 to Final Office Action mailed Apr. 25, 2024", 10 pgs.
Gehberger, Dániel, et al., "Data Driven Monitoring for Cloud Compute Systems", IEEE ACM 9th International Conference on Utility and Cloud Computing UCC Shanghai China, (2016), 10 pgs.
Souza Ramos, T. L. Alves De, et al., "Watershed A High Performance Distributed Stream Processing System", 23rd International Symposium on Computer Architecture and High Performance Computing Vitoria Brazil, (2011), 8 pgs.
"U.S. Appl. No. 16/921,690, Notice of Allowance mailed Apr. 18, 2024", 12 pgs.
Da Silva, Dimitri, et al., "Microservice Based Middleware for Collaborative Supply Chain Tracing", 15th Iberian Conference on Information Systems and Technologies (CISTI), Seville, Spain, (Jun. 2020), 6 pgs.
"U.S. Appl. No. 16/921,690, Response filed Dec. 27, 2023 to Non Final Office Action mailed Sep. 27, 2023", 11 pgs.
"U.S. Appl. No. 17/662,751, Response filed Jan. 3, 2024 to Non Final Office Action mailed Oct. 4, 2023", 11 pgs.

* cited by examiner

CLIENT-SIDE ENRICHMENT AND TRANSFORMATION VIA DYNAMIC LOGIC FOR ANALYTICS

CROSS-REFERENCE TO RELATED APPLICATION

This application is a continuation of and claims priority to U.S. patent application Ser. No. 16/921,690, filed on Jul. 6, 2020, which is a continuation of and claims priority to U.S. patent application Ser. No. 16/912,668, filed on Jun. 25, 2020, the disclosures of which are incorporated by reference herein in their entirety.

BACKGROUND

The present disclosure relates generally to systems and methods for application (or app) instrumentation and analytics data processing. More particularly, the present disclosure relates to live application instrumentation, event tracking, and dynamic analytics data processing across various platforms for improved performance, features, and uses.

For computer programming, application instrumentation may be used to measure performance of an application, gather metrics, and gather user behavior data. Instrumentation code may be incorporated into an application and managed by using a management tool. Application instrumentation may be done with an approach of collection of precise data by targeting user interaction (UI) elements and sending predefined data points per interaction or an alternative approach of collection of all UI events from clients and storage on backend analytics servers/services.

The first approach may lead to long app instrumentation and product development cycles. The second approach tries to solve problems arising from the previous approach but leads to high noise-to-signal ratio and longer times to first recognize insights as all discovery burden is now on downstream analytics systems.

Typically, instrumented digital applications bundle all logic for enrichment and transformation of data points being sent to analytics backend. These pieces of logic may be static (e.g., bundled with application code) and written to target each platform individually. It appears that there is a lack of mechanism to unbundle application and analytics code and leverage the same piece of logic written in one language, e.g., JavaScript, across multiple clients on various platforms including native mobile applications.

There have been little or no attempts to solve this problem in a manner of a packaged product for general use across varied forms of apps and industries. There is also little or no solution to help a developer use the same analytics code written in one language, e.g., JavaScript, and deploy it across various platforms including web browser, mobile application including iOS and Android.

Accordingly, it is highly desirable to find new, more efficient ways for application instrumentation, event tracking, and dynamic analytics data processing across various platforms for improved performance, features, and uses.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
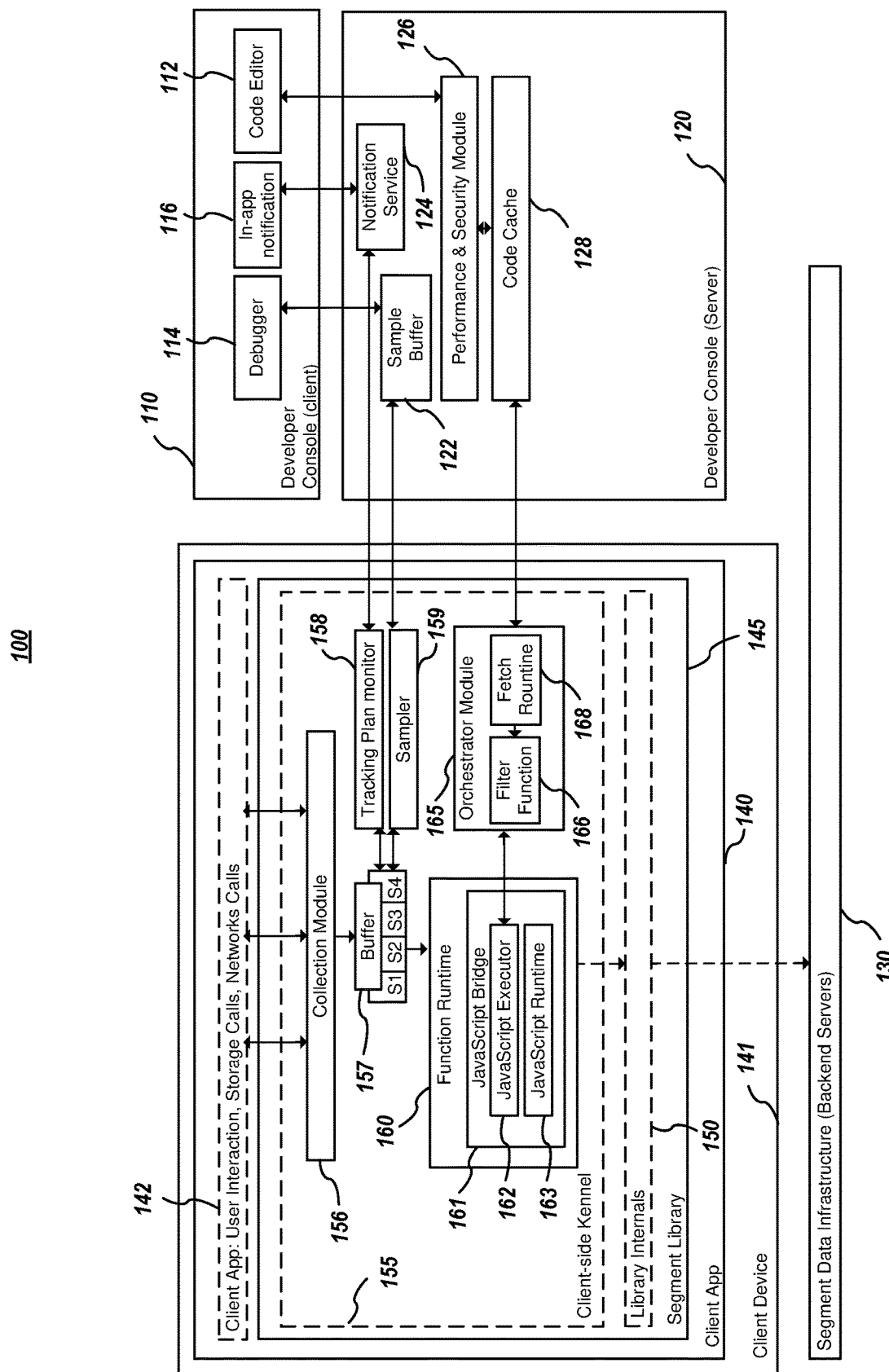
FIG. 1 depicts architecture for live application instrumentation and event tracking, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled"

shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists that follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any examples provided herein are provided by way of illustration and under specific conditions using a specific embodiment or embodiments; accordingly, neither these examples nor their implementations shall be used to limit the scope of the disclosure of the current patent document.

It shall also be noted that although embodiments described herein may be within the context of client-side enrichment and transform, aspects of the present disclosure are not so limited. Accordingly, the aspects of the present disclosure may be applied or adapted for use in other contexts.

A. Structure Embodiments

In one or more embodiments, user interaction history is recorded on-device in a memory allocation, which may be a fixed-size buffer, as one or more signals to create a dataset. In one or more embodiments, a signal is any user interaction, storage or network call or user interface (UI) element lifecycle data point on one or more client applications, which provide data and/or metadata about the interaction. The buffer of signals is passed through one or more pieces of customer logic (e.g., one or more filter functions) to qualify them as valuable data points or events instead of less relevant or irrelevant data for the application developers. Once qualified, events may be passed onto an analytics system for further processing. In one or more embodiments, a filter function is one or more pieces of customer logic written in a programming language (e.g., JavaScript) to determine whether a signal may be qualified as an event. In one or more embodiments, the piece of logic may be developed outside the client application and deployed "over-the-air". In one or more embodiments, over-the-air deployment presents an infrastructure and product architecture that is designed to enable deployment of additional logic to client applications operating one or more platforms. This infrastructure enables a scenario where new logic is loaded by client application on load without the need for rebuild of the entire application. The deployment of filter functions may be done over-the-air in real-time such that application developers do not have to rebuild and publish their applications. In one or more embodiments, over-the-air deployment may also include infrastructure designed to run inside the client applications which ensures that a single piece of logic written in one language (e.g., JavaScript) may be executed on multiple platforms.

In one or more embodiments, filter functions are written in a single language (e.g., JavaScript) and deployed across multiple target platforms including web browsers and native mobile applications.

The combination of signals, buffer, and filter functions, backed by the infrastructure to deploy these filter functions client-side applications in one or more platforms, without rebuilding or redeploying applications, contributes to this analytics instrumentation solution.

FIG. 1 depicts architecture for live application instrumentation and event tracking, according to embodiments of the present disclosure. The architecture 100 comprises a client-side developer console 110, a server-side developer console 120, an external server 130, a client-side kernel 155 running on a client device 141 and providing environment within a running library 145 to collect signals from user interactions 142 when a client application 140 is running on the client device 141. In one or more embodiments, a client-side kernel is an engine that runs on client devices and provides an environment to collect signals and run filter functions (e.g., filter functions written in JavaScript). In one or more embodiments, this kernel also holds the buffer 157. In one or more embodiments, the client-side kernel 155 also runs one or more filter functions for the collected signals. In one or more embodiments, the client-side developer console 110 is a browser application console comprising a code editor 112, a debugger 114, and an in-app notification 116. The code editor 112 provides an online text editor to allow customer code, e.g., custom JavaScript snippets, to be written. The debugger 114 provides an interface to test the custom code against sample events. The in-app notification 116 couples to receive notifications from the client device 141 via the server-side developer console 120 when one or more predetermined events are tracked during app operation. The developer console 120 may comprise a sample buffer 122, a notification service module 124, a performance and security module 126, and a code cache 128. The sample buffer 122 holds sampled events received from various clients (e.g., the client device 141) to feed the debugger 114 in the client-side developer console 110. The notification service module 124 receives a message from the client device 110 if anomalous events are observed over a fixed period of time or a fixed count of messages, and informs the end-user of anomalous signals within client-side developer console 110 (via the in-app notification module 116). The performance and security module 126 runs one or more tests against the custom code, e.g., customer JavaScript, to ensure that it meets one or more predefined performance and/or security benchmarks. The code cache 128 holds finalized filter functions or a final version of the custom code for clients to fetch.

In one or more embodiments, the custom codes are developed outside the client application and may be deployed over-the-air. In one or more embodiments, the custom codes are developed in one programming language, e.g., JavaScript, and are independent from coding type of the user application such that the deployment and operation of the custom codes may de deployed across multiple platforms, including web-based platform and mobile based platform, e.g., iOS or Android.

In one or more embodiments, the client-side kernel 155 comprises a collection module 156, a buffer 157, a tracking plan monitor 158, a sampler 159, a function runtime 160 and an orchestrator module 165. The collection module 156 module hooks into or interfaces with the UI element lifecycles storage/network abstraction layers and also captures user actions to be passed onto the buffer 157 as signals. In one or more embodiments, the buffer 157 may be a fixed-size memory allocation on the client device 141 designated to hold signals (e.g., S1, S2, . . . ) as they become available from the collection module 156. A fixed-size buffer would prevent the kernel from consuming excessive memory resources of the client device, especially when the client device is a mobile device with limited memory space. In one or more embodiment, the sampler 159 strips personally identifiable information (PII) from signals in the buffer and shares the stripped signals with the server-side developer console 120 to enable filter function debugging before deployment to client applications. In one or more embodiments, the sampler 159 may operate under various triggers, such as a fixed interval or under request to fetch signals from the buffer 157. The sampler 159 may function to evaluate the signals in the buffer to figure out details of those signals and also function to build customer logic (e.g., JavaScript logic) to focus on relevant contents of the signals. In one or more embodiments, the PII is stripped by the sampler 159 using a differentially private algorithm. The tracking plan monitors 158 samples of incoming signals and validates the signals against known data formats to ensure that user application code has not been modified by developers. If one or more anomalous events are observed over a fixed period of time or over a fixed count of messages, the tracking plan monitor may send a message to the notification service module 124, which in-turn may inform the end user of anomalous signals using the client-side developer console. In one or more embodiments, the end-user notification may be via in-app notifications.

In one or more embodiments, the function runtime 160 hosts a runtime environment, e.g., a JavaScript runtime, to run one or more filter functions. In one or more embodiments, the one or more filter functions are executed when one or more conditions are met. The conditions may include a full buffer, a new element in the buffer, and fixed time interval expiration. In one or more embodiments, the function runtime 160 couples to the orchestrator module 165 to fetch latest version of the filter functions. The orchestrator module 165 keeps the client in-sync with the develop console 120 to ensure that the latest versions of the filter functions are deployed and executing inside the kernel and sampled signals (with PII stripped) are being sent to the debugger 114 to enable filter function development in the client-side developer console.

In one or more embodiments, the function runtime 160 may comprise a bridge 161, a function executor 162, and a filter function runtime 163. The function executor 162 loads one or more customer filter functions to memory and starts passing each signal in the buffer through one or more filter functions. The filter function runtime 163 provides an environment in which the filter functions are implemented. In one or more embodiments, the filter functions are created using JavaScript code, and the filter function runtime 163 is a JavaScript runtime to provide an environment to execute the JavaScript code. The bridge 161 ensures that an appropriate filter function runtime (e.g., JavaScript runtime) is available for the function executor to run regardless of underlying platforms (e.g., a mobile platform or a web browser-based platform). In one or more embodiments, the bridge 161 is a JavaScript bridge that offers interaction between client application and signal filtering within JavaScript. If a certain signal is evaluated as true (e.g., passing one or more predefined conditions), the signal is passed as an event to a backend server 130 for further analysis. In one or more embodiments, the signal is passed to the backend server 130 via a software development kit (SDK) pipeline.

In one or more embodiments, the orchestrator module 165 comprises a fetch runtime 168 to keep the client in synchronization with server 120 for the latest version of filter functions 166, which are deployed on a client device or client application. In one or more embodiments, upon a client application start of operation, the client application's orchestrator module fetches one or more filter functions from the server-side develop console to be deployed to the client application. When the client application operates, those deployed filter functions are implemented to filter collected signals as desired events for analytics.

In one or more embodiments, before the orchestrator module fetches filter functions, the orchestrator module verifies whether the filter functions are newer or the latest version compared to filter functions deployed already in the client application. In one or more embodiments, when the client application is in an initial run without any filter function deployed, the orchestrator module may just fetch one or more filter functions available at the server without function version verification.

B. Process Embodiments for App Instrumentation and Collection

Figure 2:
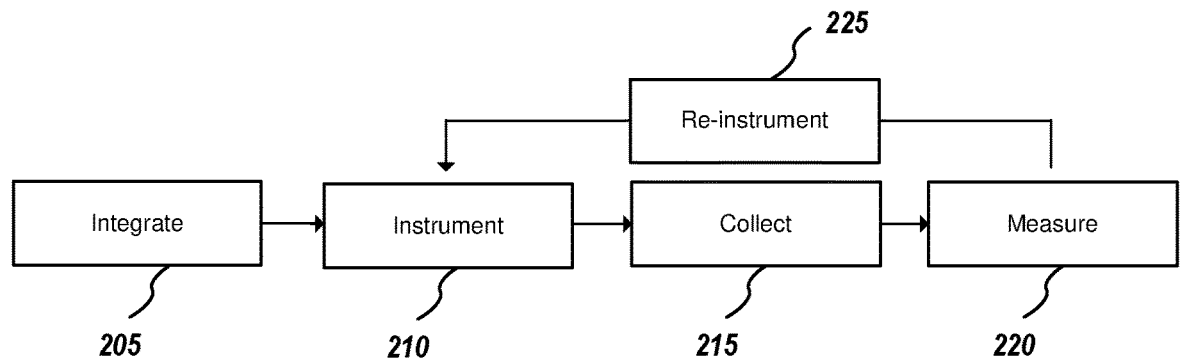
FIG. 2 depicts various phases for app instrumentation mechanism for gathering metrics and behavior data, according to embodiments of the present disclosure.

FIG. 2 depicts various phases for app instrumentation mechanism for gathering metrics and behavior data, according to embodiments of the present disclosure. As shown in FIG. 2, the app instrumentation mechanism may be depicted to comprise five phases, including an integration phase 205, an instrumentation phase 210, a collection phase 215, a measurement phase 220, and a re-instrumentation phase 225.

During the integration phase 205, a developer packages a vendor-provided SDK for a target platform to a client application. The SDK loads a client-side kernel in a client device for a capability to be connected into user interactions, storage and network calls, and system signals. In one or more embodiments, the SDK uses client-side systems to ensure that the buffer and function runtime, along with other supporting modules, e.g., a library internal 150, are present on the client application. In one or more embodiments, the function runtime is designated for operation in current client application such that any filter functions fetched from the server may only operate in a desired state to collect designated signals.

More details of the instrumentation phase 210 and the collection phase 215 are described with reference to FIG. 3 and FIG. 4, respectively. During the measurement phase 220, each event may go through an SDK pipeline into a backend server for downstream analysis. One or more decisions may be driven based on event information.

In one or more embodiments, when changes are desired (e.g., different events needed from collected signals), a fresh set of signals may be sampled via the developer console and one or more new filter functions are developed and debugged in the re-instrumentation phase 225. Once the one or more new filter functions pass performance and secure test, they are deployed over-the-air again to the client app for collection operation.

Figure 3:
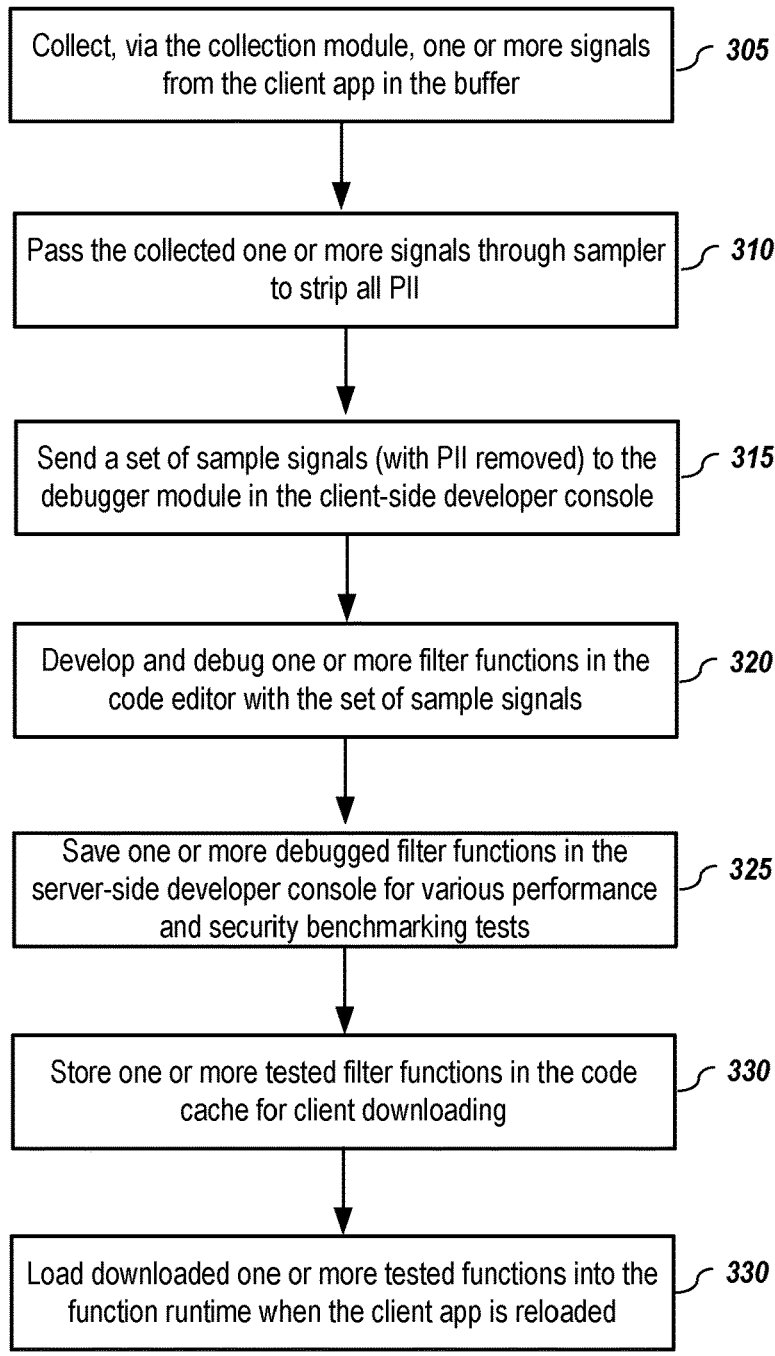
FIG. 3 depicts a procedure during an app instrumentation phase, according to embodiments of the present disclosure.

FIG. 3 depicts a procedure during the app instrumentation phase, according to one or more embodiments of the present disclosure. During this app instrumentation phase, one or more signals from the client app are auto-tracked or collected (305) via the collection module in the buffer 157. In one or more embodiments, the collected one or more signals are passed (310) through sampler (using a differential privacy process) to strip all PII for sampled signals or sampled data points. Differential privacy is a system for publicly sharing information about a dataset by describing the patterns of groups within the dataset while withholding information about individuals in the dataset. A differential privacy process makes it possible to collect and share aggregate information about user habits, while maintaining the privacy of individual users. Afterwards, a set of sampled signals are sent (315) to sample buffer in the server-side developer console and forwarded to the debugger module in the client-side developer console. Once sampled signals are available under the debugger module, a developer may use a browser application and develop (320) one or more filter functions, e.g., JavaScript code, in the code editor. After one or more iterations of debugging the custom code, the developer may save (325) the debugged one or more filter functions in the server-side developer console for various performance and security benchmarking tests. In one or mode embodiments, the test is run on every save from browser application. Post security and performance checks, the tested one or more filter functions are stored (330) in the code cache for client downloading by the integrated client application via the fetch routine. The downloaded one or more filter functions are loaded (335) into the function runtime when the client app is reloaded. In one or more embodiments, the downloading may be implemented via over-the-air deployment.

Figure 4:
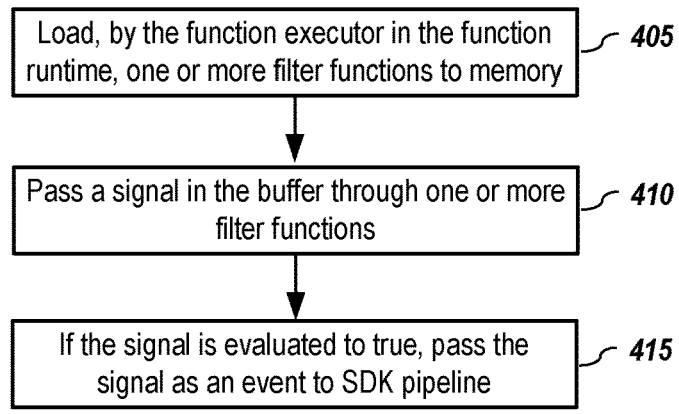
FIG. 4 depicts a procedure during a collection phase, according to embodiments of the present disclosure.

FIG. 4 depicts a procedure during a collection phase, according to embodiments of the present disclosure. Once instrumentation code is deployed to a client app, it is available to the function executor to fetch from the orchestrator module. The function executor in the function runtime loads (405) a copy of one or more filter functions to memory and may start passing (410) each signal in the buffer 157 through one or more filter functions. The bridge 161 ensures that an appropriate runtime, e.g., a JavaScript runtime, is available for the function executor to run the loaded filter functions regardless of underlying platforms (e.g., a mobile). If a signal evaluated via a filter function or functions to true (e.g., passing one or more predefined conditions), the signal may be passed (415) as an event to the SDK pipeline and may be passed to the backend server via the library internals.

C. Some Exemplary Embodiments

It shall be noted that the examples and processes are provided by way of illustration and were performed under specific conditions using a specific embodiment or embodiments; accordingly, neither these examples nor their processes shall be used to limit the scope of the disclosure of the current patent document.

Figure 5:
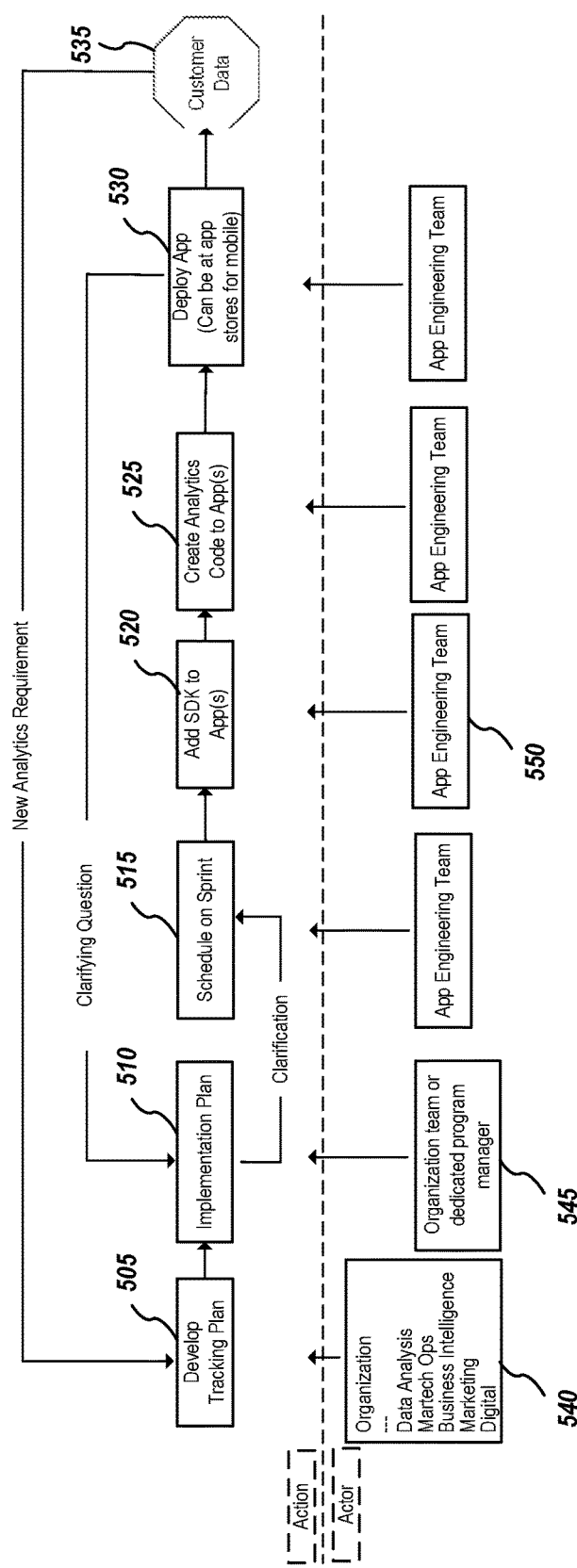
FIG. 5 depicts a current flow process for application instrumentation and event tracking, according to embodiments of the present disclosure.

FIG. 5 depicts a current flow process for application instrumentation and event tracking, according to embodiments of the present disclosure. Upon a tracking plan is made (505) and an implementation plan is determined (510), workload management may be scheduled (515), e.g., on a sprint under the SCRUM framework. Afterwards, an SDK for a target platform related to the client is added (520) to a client application. This SDK may include a client-side kernel for a capability to collect and process user interactions, storage and network calls and system signals. Analytics code is then created (525) into client applications, which are deployed (530) into client devices to generate (535) customer data. In response to new analytics requirements, the flow goes back to step 505 for new tracking plan development. In response to questions to be clarified for application deployment, the flow goes back from step 530 to step 510 for re-evaluating the implementation plan.

In one or more embodiments, step 505 for tracking plan development is driven by organization desirability 540 including data analysis, marketing technology (Martech) operations, business intelligence, marketing, etc.; step 510 for plan implementation may involve an organization team or a dedicated program manager 545; and steps 515-530 involve an App engineering team 550 for work scheduling, SDK integration into client applications, and analytics code creation and deployment.

As shown in FIG. 5, whenever a new analytics requirement is emerged, the whole processes have to be started again for new SDK and new application deployment.

Figure 6:
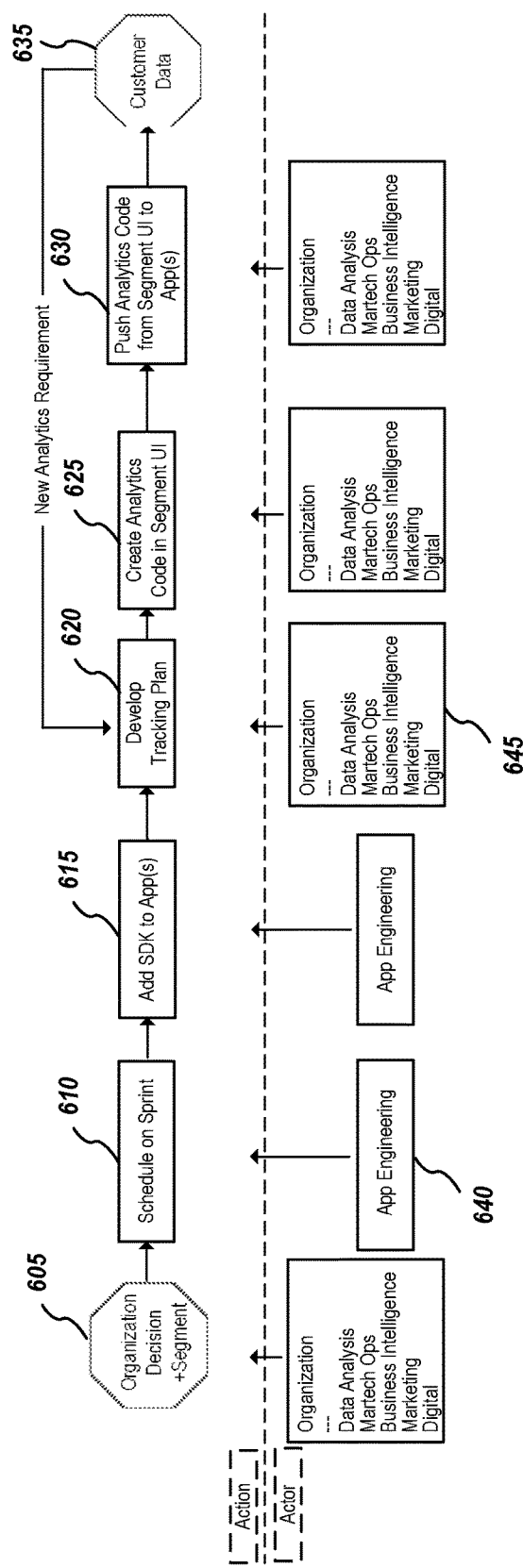
FIG. 6 depicts flow process of an application example for live application instrumentation and event tracking, according to embodiments of the present disclosure.

FIG. 6 depicts the flow process of an application example for live application instrumentation and event tracking, according to embodiments of the present disclosure. Upon an organization decision is made (605), and work scheduled (610) on a framework (e.g., a sprint under the SCRUM) for a client (e.g., a media company), SDK for a target platform related to the client is added (615) to a client application installed on customer's client application which is consumed by the client's customers in turn. This SDK may include a client-side kernel for a capability to collect and process user interactions, storage and network calls and system signals. In one or more embodiments, the client-side kernel may include function runtime to support client application operation across multiple mobile platforms (e.g., iOS or Android). Afterwards, one or more tracking plans are developed (620) and analytics code (or filter functions) is created (625) based at least on the developed one or more tracking plans. The creation of analytics code may include code writing, debugging, and testing, as described in aforementioned embodiments.

In one or more embodiments, the client (e.g., the media company) establishes its data requirements and organization needs for analytics. The development of analytics code may follow a SCRUM project management methodology. SCRUM is an agile framework for developing, delivering, and sustaining complex products. Under the SCRUM, all new work may be allocated to a sprint. A sprint, also known as iteration or time-box, is the basic unit of development in SCRUM. Once customer apps are developed with the analytics code incorporated, the apps are released. The client's customers may use the apps and analytics date may be generated. The generated data may be sent through the Segment data infrastructure (or the backend servers).

Once the analytics code created, the analytics code is pushed (530) from the developer console (e.g., a Segment user interface) into client applications on the mobile devices. The analytics code is implemented, when the client applications are operating, to generate events (or customer data 635) for analytics. In response to new analytics requirements, the flow goes back to step 620 for new tracking plan development.

In one or more embodiments of the exemplary application, steps 610 and 615 involve at least App engineering 640 for SDK integration into client applications and publishing new app to the distribution channel (e.g., an app Store). Those mobile devices may use various platforms, such as Android, iOS, Chrome OS, Windows Mobile, etc. The SDK is configured such that analytics code (filter functions) may be deployed and operate across all the platforms.

In one or more embodiments of the exemplary application, steps 620-630 relate to customer analytics code driven by organization desirability 645 including data analysis, marketing technology (Martech) operations, business intelligence, marketing, etc. The separation of customer analytics code from SDK ensures that customer analytics code may be written in one language (e.g., JavaScript) and deployed across all platforms without reliance on engineering teams.

Compared to the process in FIG. 5, the process in FIG. 6 has the step (615) of adding SDK before the step (620) of developing a tracking plan. Such an arrangement ensures that the SDK may be independent of tracking plans and only need to load once into client applications. Furthermore, in response to newly developed tracking plan, only new analytics code (or filter functions) needs to be created instead of starting from a new SDK. Additionally, this new code may be pushed into client applications over-the-air without needing re-installation or new-starting of the client application. Both features significantly increase efficiency to support dynamic analytics requirements.

D. Structure Embodiments for Event Enrichment and Transformation

In one or more embodiments, analytics data collected in client applications is transformed and enriched before being sent to downstream pipeline using native code and logic bundled into the core application code. The native code refers to programming code that is configured to run on a specific processor. This additional logic specific to manipulation of logic for analytics may be unbundled from client-side application code and still be executed on on-device and achieve the same result. In one or more embodiments, the logic may also be written in a single language, e.g., JavaScript, and run across all clients including native mobile apps. In one or more embodiments, a native mobile app is referred as an application coded in a specific programming language and installed directly on the mobile device. A native mobile app may operate without requiring a web browser for data communication.

Figure 7A:
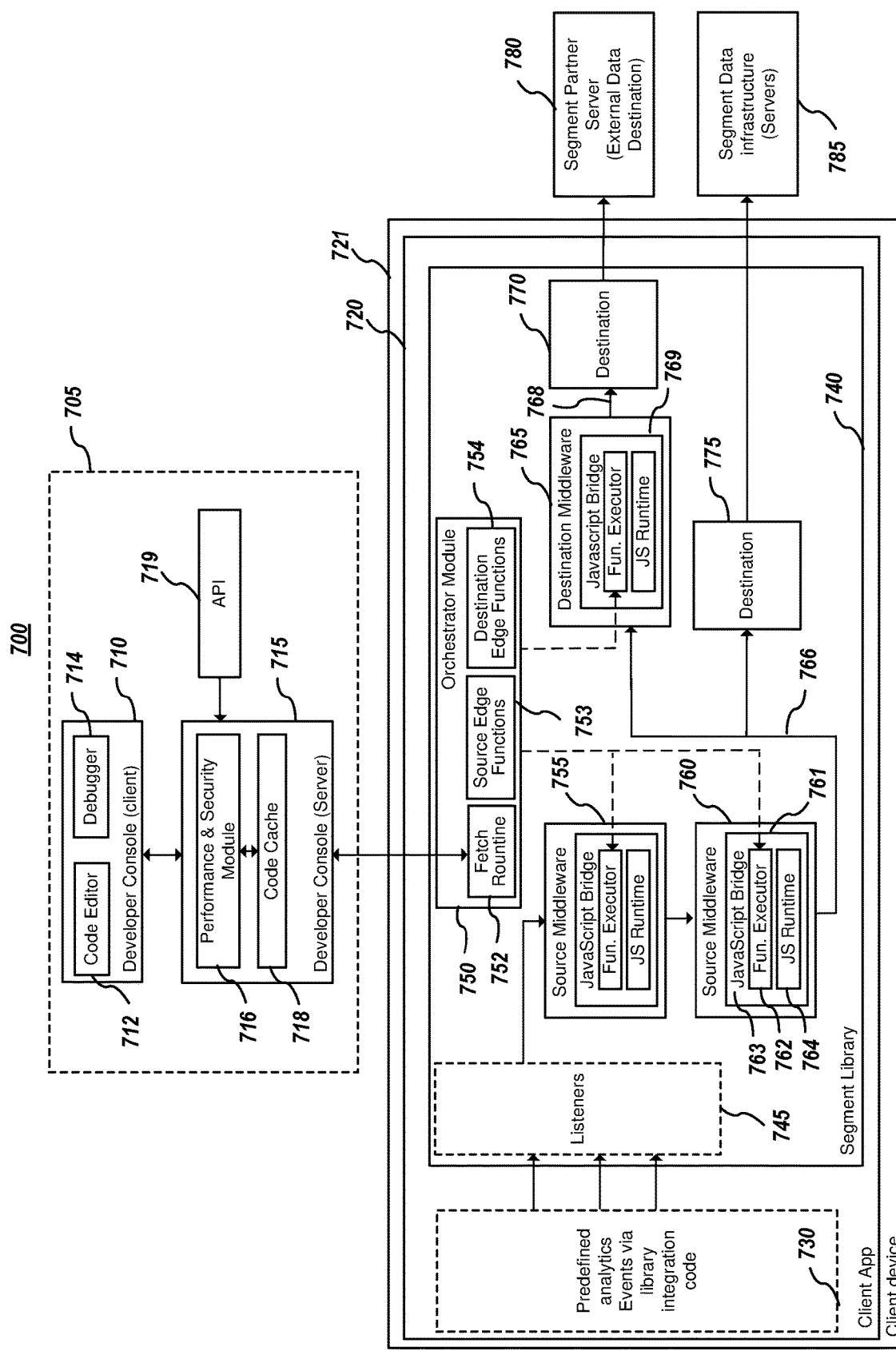
FIG. 7A depicts architecture for event enrichment and transformation implementation, according to embodiments of the present disclosure.

FIG. 7A depicts architecture 700 for event enrichment and transformation implementation, according to one or more embodiments of the present disclosure. An event is referred to as one or more data points useful for analytics in one or more embodiments. The architecture 700 comprises a developer console 705, a client runtime 720, an external server 780 as a destination, and a data infrastructure server 785. The developer console 705 comprises a frontend application (e.g., a client-side console) 710 and a backend application (e.g., a server-side console) 715 coupled to the client-side console 710. In one or more embodiments, the client-side console 710 is a browser application console comprising a code editor 712 and a debugger 714. The code editor 712 provides an online text editor to allow customer code, e.g., custom JavaScript snippets, to be written. In one or more embodiments, the customer code may be written as one or more edge functions. In one or more embodiments, an Edge Function is a piece of customer logic written in a programming language, e.g., JavaScript, which is implemented to enrich or transform one or more events, wherein event enrichment may be referred as logic to append additional data points to an event and event transformation may be referred as logic to change one or more keys or values for a given event. An edge function may be developed outside the client application and deployed over-the-air. In one or more embodiments, over-the-air deployment presents an infrastructure and product architecture that is designed to enable deployment of additional logic to client applications operating one or more platforms. This infrastructure enables a scenario where new logic is loaded by client application on load without the need for rebuild of the entire application. In one or more embodiments, an Edge Function may be a source edge function (also known as source customer logic) or a destination edge function (also known as destination customer logic). In one or more embodiments, the architecture also includes infrastructure designed to run inside the client applications which ensures that a single piece of logic written in in a programming language, e.g., JavaScript, may be executed in one or more platforms.

In one or more embodiments, the debugger 714 provides an interface to test the custom code against sample events. The server-side console 715 may comprise a performance and security module 716 and a code cache 718. The performance and security module 716 runs one or more tests against the custom code, e.g., customer JavaScript, to ensure that it meets one or more predefined performance and security benchmarks. The code cache 718 holds a final version of the custom code for clients to fetch on load. In one or more embodiments, the edge functions are developed outside the client application and may be deployed over-the-air. In one or more embodiments, the edge functions are developed in one programming language, e.g., JavaScript, and are independent from the underlying programming environment of the user application such that the deployment and operation of the edge functions may across multiple platforms including web-based platform, iOS, or android. In one or more embodiments, custom code may reach the code cache 718 via an application program interface (API) 719. In one or more embodiments, the API may be a Configuration API or a representational state transfer (REST) API for data transfer over hypertext transfer protocol (HTTP).

In one or more embodiments, the client-side runtime 720 is an execution environment or app that provides a state for on the client-side device 721 (e.g., on a user mobile device) to have access to resources, such as software libraries, system variables, and environment variables, and provide all necessary services and support to the processes involved in the execution of client side enrichment and transform. In one or more embodiments, the client-side runtime 720 comprises a module for listeners 745, an orchestrator module 750, one or more source middleware, e.g., middleware 755 and 760, and a destination middleware 765. In one or more embodiments, a listener is a library interface exposed to one or more client applications for integrating and sending analytics data. In one or more embodiments, a middleware is a mechanism built into analytics libraries which allow hooking of custom logic in language native to the platform.

Each source or destination middleware may incorporate a function runtime, e.g., 761. In one or more embodiments, the module for listeners 745, the orchestrator module 750, the one or more source middleware, the destination middleware 765, and one or more function runtime, e.g., 761, are incorporated into an analytics library (or Segment library) 740. The module for listens receives information of pre-defined analytics events 730 via library integration code when one or more user applications are operating. In one or more embodiments, the orchestrator module 750 comprises a fetch runtime 752 to keep the client in synchronization with servers for the latest version of source edge functions 753 and/or destination edge functions 754, which are deployed on client device or client application.

In one or more embodiments, the function runtime may be incorporated within a source middleware 755 and 760, and/or a destination middleware 765. The function runtime 761 may comprise a function executor 762, a bridge 763, and an edge function runtime (may also be referred as customer logic runtime) 764. The function executor 762 applies present edge functions (source edge functions or destination edge function, depending on whether the function is within source middleware or destination middleware) in the function runtime. The edge function runtime 764 provides an environment in which the present edge functions are implemented. In one or more embodiments, the present edge functions are created using JavaScript code and the edge function runtime 764 is a JavaScript runtime (shown as JS runtime in FIG. 7A) to provide an environment to execute the JavaScript code. The bridge 763 facilitates a coupling between the edge function runtime 764 and the (source or destination) middleware such that the runtime and the middleware (native abstraction) may work together with each component having its own interface. In one or more embodiments, the bridge 763 is a JavaScript bridge to offer interaction between client application and event enrichment/transformation within JavaScript.

In one or more embodiments, one or more source middleware are cascaded such that enrichment and transformation applied by implementing edge functions in one source middleware are passed to downstream source middleware. In other words, any event processed in a middleware has been incorporated all enrichment and transformation applied in all previous middleware. In one or more embodiments, after all source middleware with all source edge functions applied sequentially, the processed (e.g., enriched and/or transformed) event 766 is passed to a destination 775 coupled to a data infrastructure server 785 for analytics information communication. In one or more embodiments, a destination middleware 765 is incorporated to further process the enriched/transformed event to get a specifically enriched/transformed event 768 for a specific destination interface 770, which couples to the external server 780 for specific analytics information communication. In one or more embodiments, a function runtime 769 may be incorporated within the destination middleware and may also comprise a function executor, a bridge (e.g., a JavaScript bridge), and an edge function runtime (e.g., a JavaScript runtime). Those components within the function runtime 769 may have similar function as corresponding components within the function runtime 761. Specifically, the function executor in the function runtime 769 applies present destination edge functions for the specific destination interface 770. In one or more embodiments, a destination is a backend data infrastructure which receives data from an analytics library.

Figure 7B:
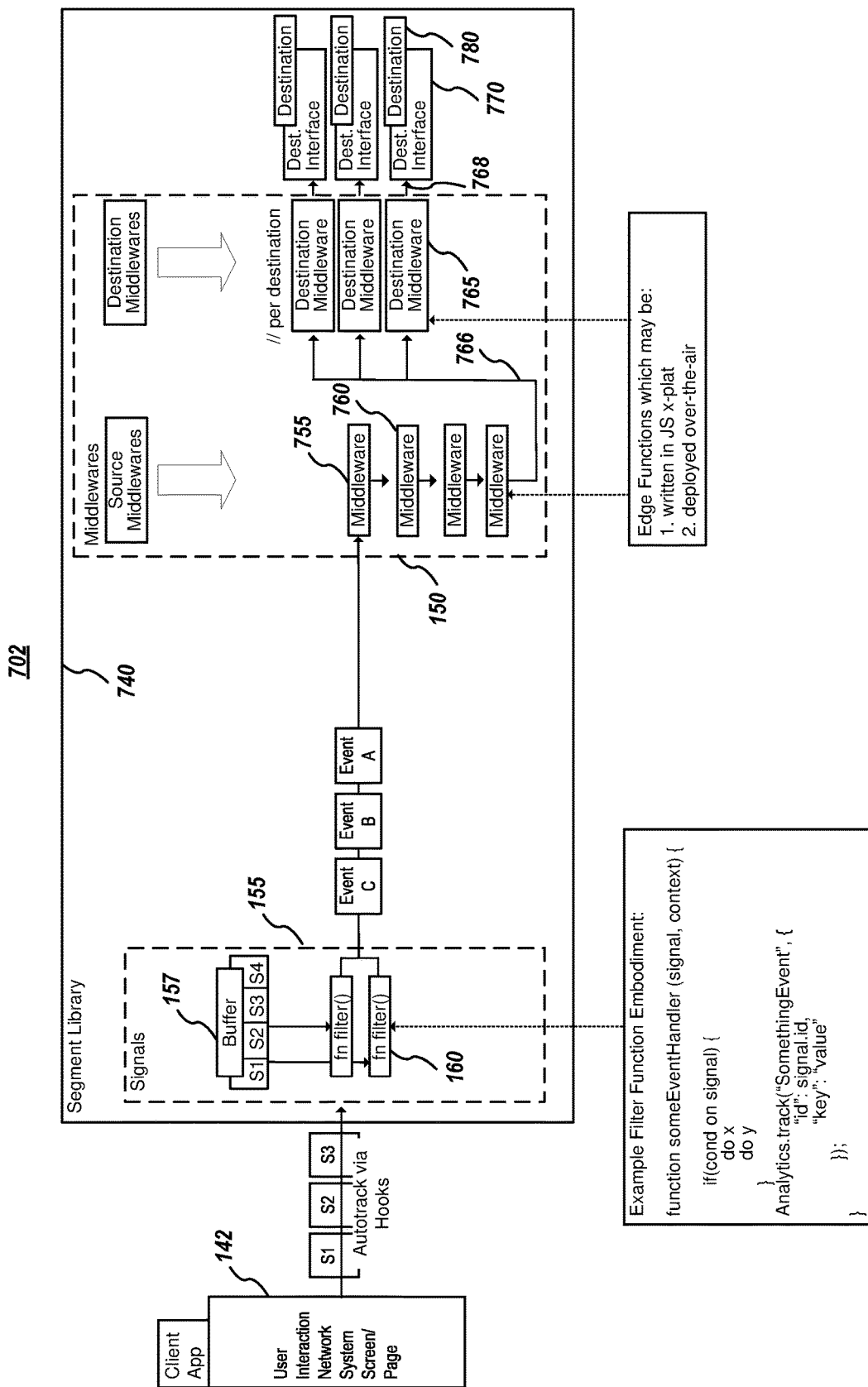
FIG. 7B depicts another architecture for event enrichment and transformation implementation, according to embodiments of the present disclosure.

FIG. 7B depicts another architecture 702 for event enrichment and transformation implementation, according to embodiments of the present disclosure. In one or more embodiments, instead of getting events through the module for listeners 745, as shown in the architecture 700 in FIG. 7A, the one or more source middleware 755 may alternatively receive one or more events, e.g., events A, B, and C, directly from the client-side kernel 155. In one or more embodiments, the kernel comprises the buffer 157 to store one or more signals (e.g., signals S1, S2, S3, and S4), which are collected from user interactions 142 when a client application 140 is running on a client device. In one or more embodiments, user interactions are auto-tracked via hooks and captured as signals to be passed onto the buffer 157. In one or more embodiments, the client-side kernel 155 runs one or more filter functions 160 to process the collected signals. Details of the buffer 157 and the filter functions 160 are described in the disclosure with reference to FIG. 1. Those descriptions may also be applicable to one or more embodiments for the architecture shown in FIG. 7B.

In one or more embodiments, an event may be generated from one or more signals. Each signal, such as a raw data, may provide one or more pieces of information, which are evaluated by one or more filter functions to determine whether the one or more pieces of information may be useful as an event or a part of an event. Each filter may be configured to focus one or more specific aspects for signal evaluation. In one or more embodiments, an event may comprise multiple pieces of information filtered from multiple signals. Those multiple pieces of information, in combination, make the event full and useful for downstream analytics.

In one or more embodiments, one or more source middleware and one or more destination middleware are deployed within the library internal 150, which functions as a module in the SDK pipeline between the generated events and the one or more destinations 780. In one or more embodiments, the one or more source middleware, e.g., source middleware 755 and 760, form a chain. Present source edge functions in the source middleware chain may be run sequentially to obtain a processed event 766 with all enrichment and transformation in the source middleware chain applied.

In one or more embodiments, one or more destination middleware, e.g., the destination middleware 765, are incorporated to further process the event 766, which is enriched and/or transformed by the source middleware chain, to get one or more specifically enriched/transformed events corresponding to destinations. For example, the destination middleware 765 processes the event 766 to obtain the specifically enriched/transformed event 768, which is passed to the destination 780 via for a specific destination interface 770 for specific analytics information communication.

In one or more embodiments, filter functions and edge functions for the source and/or destination middleware may be written in a JavaScript platform and deployed over-the-air. Embodiments for development of filter functions and edge functions are described with respect to FIG. 1 and FIG. 7A, respectively. In one or more embodiments, the developer consoles 110 and 120 for filter functions development and deployment is independent and/or separated from the developer console 705 for edge functions development and deployment. Such a separation of filter functions from edge functions for development and deployment may provide an enhanced user privacy protection because the process of dynamic analytics has no control for instrumentation and event tracking.

E. Process Embodiments for Event Enrichment and Transformation

Figure 8A:
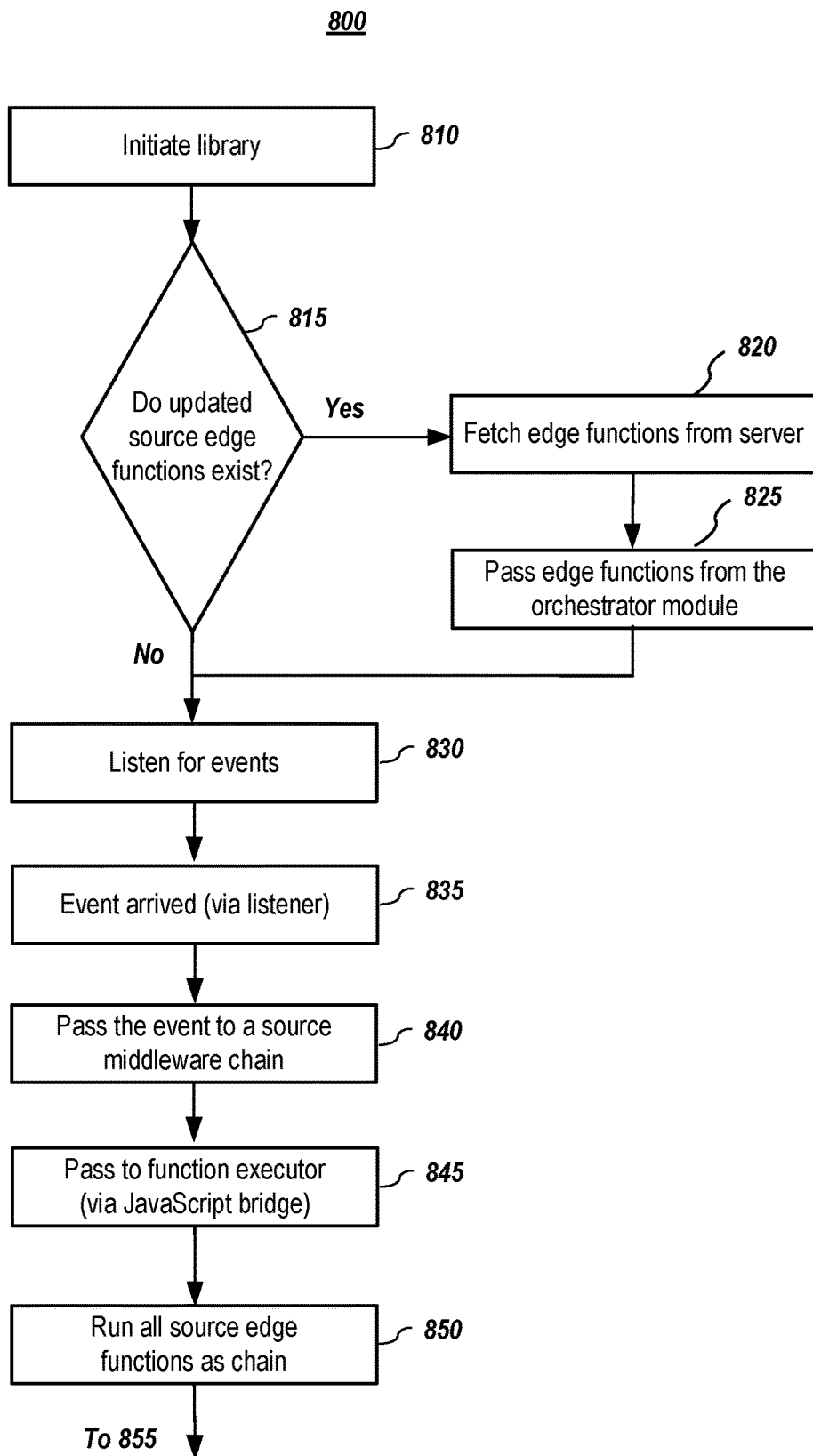
FIG. 8A and FIG. 8B depicts a process for event enrichment and transformation implementation, according to embodiments of the present disclosure.
Figure 8B:
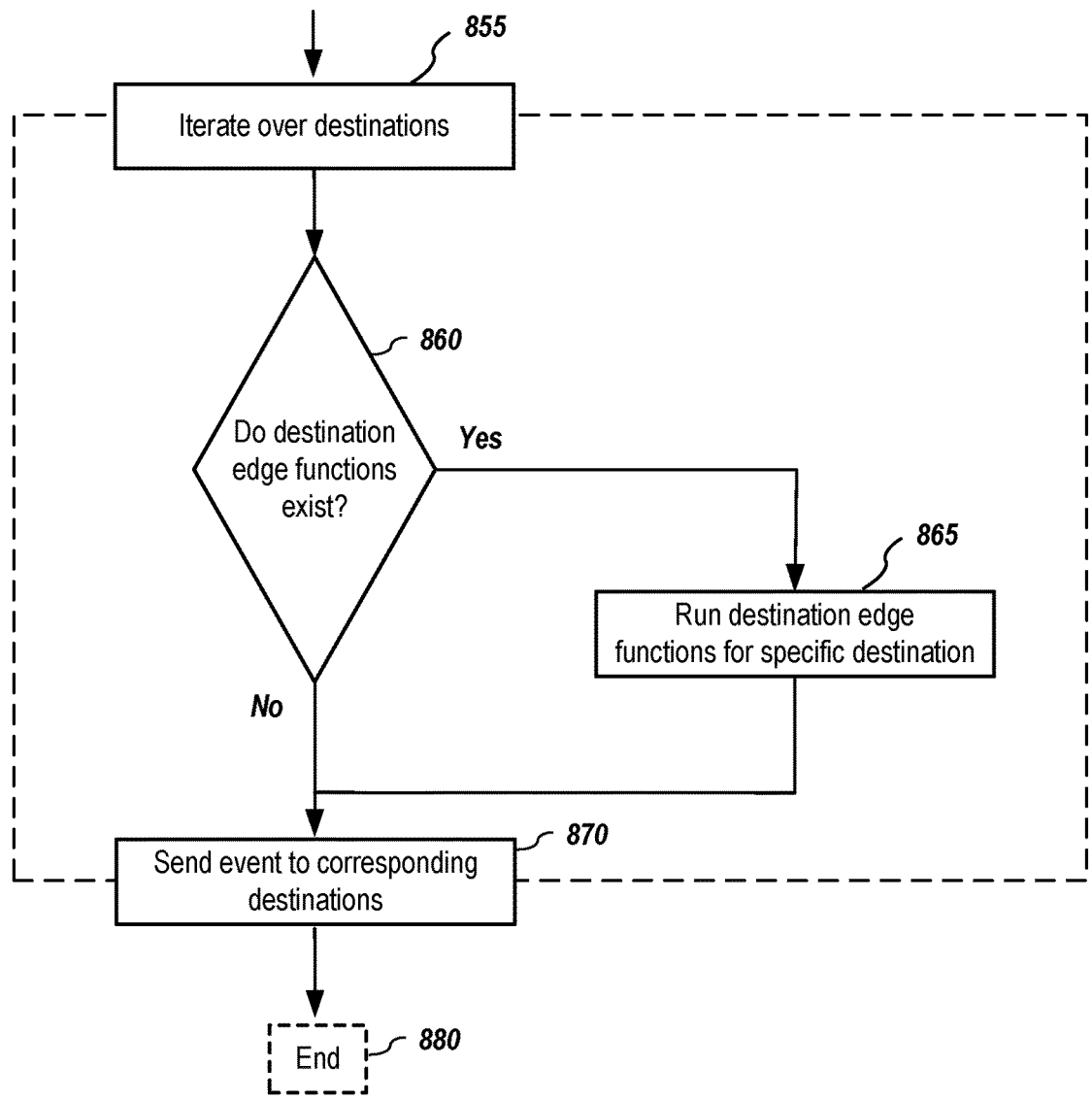

FIG. 8A and FIG. 8B depict a process for event enrichment and transformation implementation, according to embodiments of the present disclosure. Library is initiated (810) when an application app is started. An inquiry is made to check (815) whether latest or newer edge functions (source edge functions and/or destination edge functions) are available at the server-side console 715. In one or more embodiments, a release data or edge function version number may be used to verify whether edge functions at the server-side console are newer than current edge functions in client-side runtime. In response to newer edge functions available, those edge functions at the server-side console are fetched (820) via the orchestrator module 750. Code of the fetched edge functions are fetched (825) from the orchestrator module 750 into corresponding function executors as present (source or destination) edge functions of the source or destination middleware. In response to no updated edge functions being available, existing edge functions in the middleware are functioned as present edge functions. Events are listened to or monitored (830) when one or more applications are operating. In one or more embodiments, the events may be predefined analytics events listened via library integration code. When one or more event appears, those events are captured (835) by the listener module and passed (840) to a source middleware chain comprising one or more source middleware. All present source edge functions in the source middleware chain are run (850) sequentially to obtain an event with all enrichment and transformation applied in the source middleware chain.

In one or more embodiments, the event with all enrichment and transformation is iterated (855) over one or more destinations for analytics information. An inquiry is made to check (860) whether one or more destination edge functions are available for a specific destination. In response to an affirmative confirmation, the one or more destination edge functions are run (865) to obtain an event with specific enrichment and transformation, which is sent (870) to the specific destination. In response to a negative confirmation for step 860, the flow process goes to step (870), in which the event with all enrichment and transformation applied in the source middleware chain is also sent to respective destinations. Afterwards, the process for event enrichment and transformation implementation ends (880).

One skilled in the art shall understand variations from the flow shown in FIGS. 8A-8B may exist with certain steps may be performed in different orders and/or certain steps done concurrently. For example, the checking and fetching of newer versions of source edge functions and destination edge functions from the server-side console may be done concurrently or sequentially. Similarly, the passing of source and destination edge functions from the orchestrator module 750 into corresponding function executor may also be done concurrently or sequentially.

F. Embodiments of Flow for Edge Function Development

Figure 9:
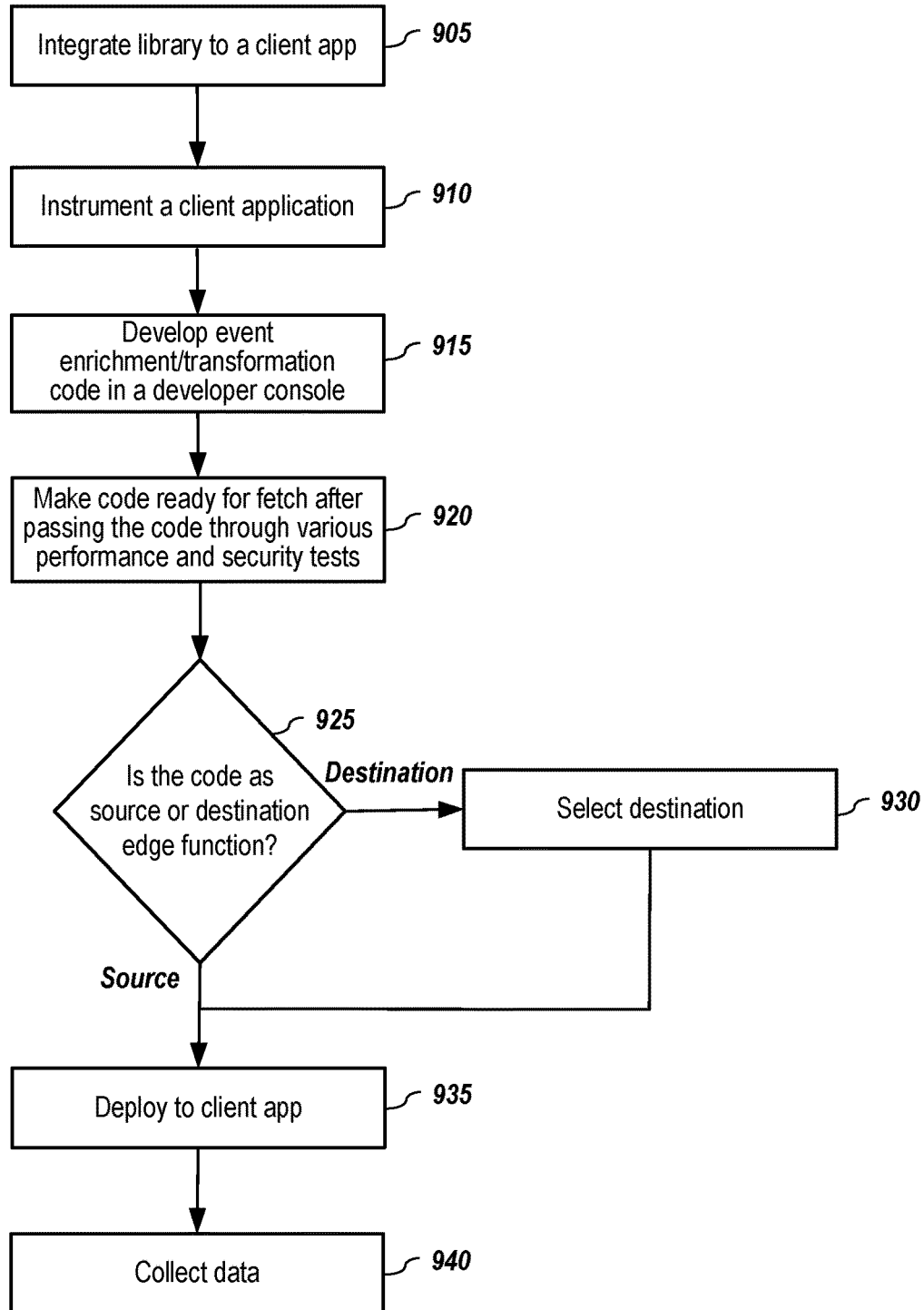
FIG. 9 depicts a flow for edge function development, according to embodiments of the present disclosure.

FIG. 9 depicts a flow for edge function development, according to embodiments of the present disclosure. A library is integrated (905) by a developer into one or more client applications and instrumentation code is added (910) across one or more client applications. In one or more embodiments, the developer may access a developer console (e.g., a browser application) and develop (915) various enrichment and transformation logic in a developer console. In one or more embodiments, the development of various enrichment and transformation logic comprises first creating the enrichment and transformation logic, e.g., by using JavaScript inside the code editor in the client-side console; debugging the created logic using the debugger in the client-side console; and loading the debugged logic into the server. In one or more embodiments, the enrichment and transformation logic may also be created in a client's own coding environment and be pushed to the server-side console via an API. In one or more embodiments, once a piece of logic is finalized or ready to be loaded into the server, it is configured to run as either source or destination edge function. In one or more embodiments, the logic is loaded in the backend server along with its configuration as source or destination edge function. In one or more embodiments, each piece of logic is run (920) through various performance and security tests and is available for client applications to fetch on load.

In one or more embodiments, upon a client application starts operation, the client application's orchestrator module fetches edge functions and verifies (925) as source edge functions or destination edge functions. In response to an edge function being configured as a destination edge function, a destination middleware is selected (930) corresponding to the destination edge function. In one or more embodiments, when a chain of source functions are fetched, a function executor of each source middleware views a chain of source edge functions and identifies a corresponding source edge function from the chain. Upon identification of corresponding middleware for all fetched edge functions, the fetched edge functions are deployed (935) to the client application. When the client application operates, those deployed edge functions are implemented or executed over the corresponding edge function runtime (e.g., JavaScript runtime) interface with corresponding middleware to collect (940) data for analytics. In one or more embodiments, all middleware may have the same middleware layer across all edge functions for the same runtime across all edge functions. In one or more embodiments, all the deployed edge functions use the same middleware abstraction of the analytics library 740.

In one or more embodiments, before the orchestrator module fetches edge functions, the orchestrator module verifies whether the edge functions are newer or the latest version compared to edge functions deployed already in the client application. In one or more embodiments, when the client application is initially run without any edge function deployed, the orchestrator module may just fetch edge functions available at the server without function version verification.

In an example of an e-commerce vendor with deployed client-side enrichment and transformation, when a payload with an issue (e.g., a wrong key name for a given value) comes through the analytics system, the issue may be corrected with the key name updated or corrected once for all via the client-side enrichment and transformation without having to wait a next software release cycle by the e-commerce vendor. Otherwise by the time that the payload is processed, there would be a large amount of wrong data generated and need to be corrected, which is time consuming. With the capacity to operate in various platforms, the system with deployed client-side enrichment and transformation may be able to address the issue no matter whether a user application for e-commerce is a web application, a mobile application for iOS, or a mobile application for Android. Such a capacity greatly enhanced utility and robustness for the operation of the e-commerce vendor.

G. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
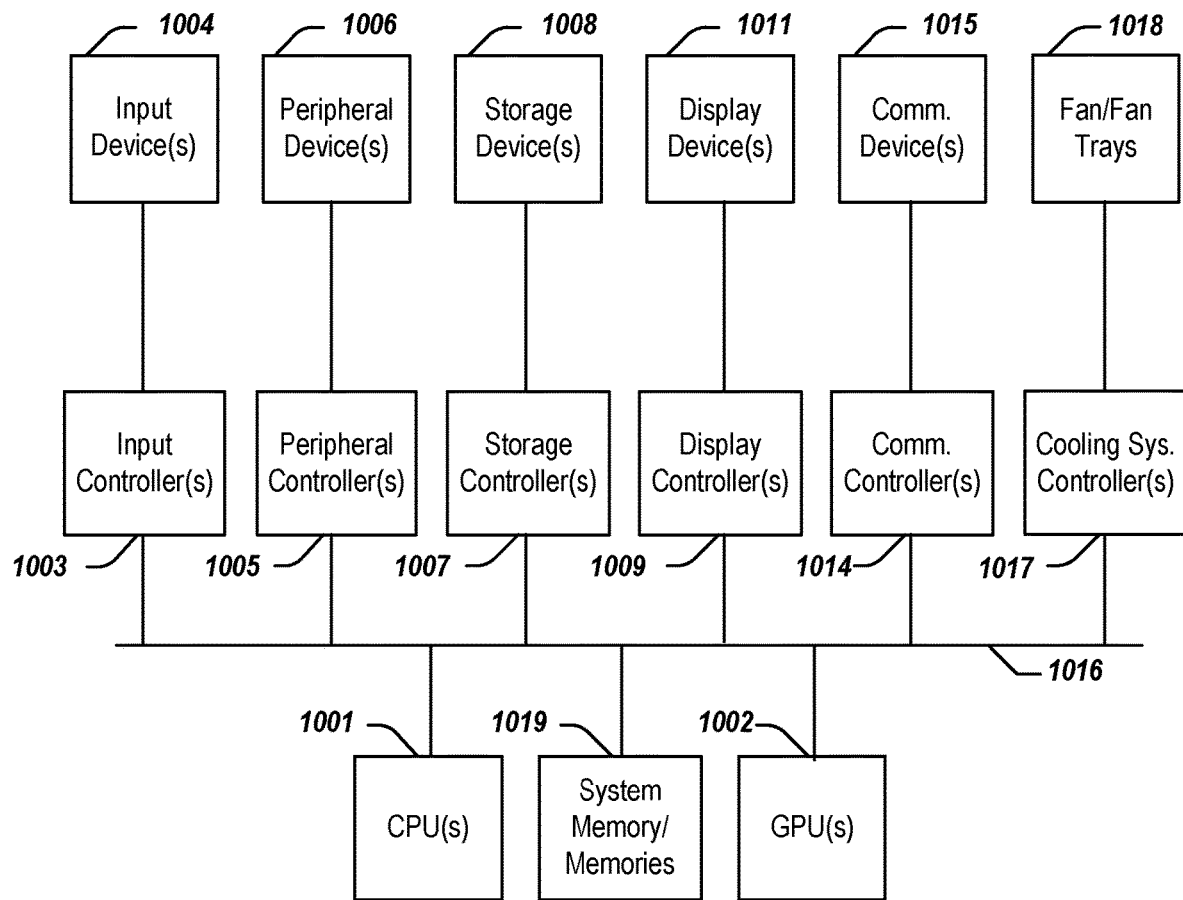
FIG. 10 depicts a simplified block diagram of an information handling system (or computing system) according to embodiments of the present invention.

FIG. 10 depicts a simplified block diagram of an information handling system (or computing system), according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more central processing units (CPU) 1001 that provides computing resources and controls the computer. CPU 1001 may be implemented with a microprocessor or the like, and may also include one or more graphics processing units (GPU) 1002 and/or a floating-point coprocessor for mathematical computations. In one or more embodiments, one or more GPUs 1002 may be incorporated within the display controller 1009, such as part of a graphics card or cards. Thy system 1000 may also include a system memory 1019, which may comprise RAM, ROM, or both.

A number of controllers and peripheral devices may also be provided, as shown in FIG. 10. An input controller 1003 represents an interface to various input device(s) 1004, such as a keyboard, mouse, touchscreen, and/or stylus. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT) display, a thin film transistor (TFT) display, organic light-emitting diode, electroluminescent panel, plasma panel, or any other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infra-red signals. As shown in the depicted embodiment, the computing system 1000 comprises one or more fans or fan trays 1018 and a cooling subsystem controller or controllers 1017 that monitors thermal temperature(s) of the system 1000 (or components thereof) and operates the fans/fan trays 1018 to help regulate the temperature.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A system comprising:
   one or more computer processors;
   one or more computer memories; and
   a set of instructions incorporated into the one or more computer memories, the set of instructions configuring the one or more computer processors to perform operations, the operations comprising:
   accessing a data set from a buffer on a client device, the data set representing one or more signals of the client device, the client device including a collection module, an orchestrator module, the buffer, and a tracking plan monitor, the collection module capturing one or more user actions and passing the one or more user actions to the buffer as the one or more signals of the client device;
   qualifying, using the tracking plan monitor, the one or more signals as one or more events, the qualifying including passing the one or more signals through a filter logic, the filter logic being configured to qualify the one or more signals as the one or more events based on a value or relevancy of one or more data points included in the one or more signals, the filter logic having been developed outside of a client application of the client device and loaded into the client application without rebuilding the client application, the orchestrator module keeping the client device in synchronization with a developer console for a latest version of the filter logic; and
   passing the one or more events through a chain of middleware built into an analytics library to enrich the one or more events, each middleware in the chain of middleware including a function runtime, the function runtime providing an operating environment in which an edge function is implemented within each middleware.

2. The system of claim 1, wherein the filter logic is deployed to the client application over-the-air.

3. The system of claim 1, wherein the filter logic is deployed to the client application in real time.

4. The system of claim 1, wherein the one or more signals are passed through a plurality of filter logic, the plurality of filter logic having been developed outside of the client application of the client device and loaded into the client application without rebuilding the client application, and wherein the plurality of filter logic are written in a single language and the client application includes infrastructure that ensures the plurality of filter logic are executable independently of a platform of the client device.

5. The system of claim 1, the operations further comprising:
   fetching the filter logic upon loading of the client application.

6. The system of claim 5, wherein the fetching of the filter logic is based on release data associated with the filter logic.

7. The system of claim 6, wherein the release data is used to verify whether the filter logic is a latest versions.

8. A method comprising:
   accessing a data set from a buffer on a client device, the data set representing one or more signals of the client device, the client device including a collection module, an orchestrator module, the buffer, and a tracking plan monitor, the collection module capturing one or more user actions and passing the one or more user actions to the buffer as the one or more signals of the client device;
   qualifying, using the tracking plan monitor, the one or more signals as one or more events, the qualifying including passing the one or more signals through a filter logic, the filter logic being configured to qualify the one or more signals as the one or more events based on a value or relevancy of one or more data points included in the one or more signals, the filter logic having been developed outside of a client application of the client device and loaded into the client application without rebuilding the client application, the orchestrator module keeping the client device in synchronization with a developer console for a latest version of the filter logic; and
   passing the one or more events through a chain of middleware built into an analytics library to enrich the one or more events, each middleware in the chain of middleware including a function runtime, the function runtime providing an operating environment in which an edge function is implemented within each middleware.

9. The method of claim 8, wherein the filter logic is deployed to the client application over-the-air.

10. The method of claim 8, wherein the filter logic is deployed to the client application in real time.

11. The method of claim 8, wherein the one or more signals are passed through a plurality of filter logic, the plurality of filter logic having been developed outside of the client application of the client device and loaded into the client application without rebuilding the client application, and wherein the plurality of filter logic are written in a single language and the client application includes infrastructure that ensures the plurality of filter logic are executable independently of a platform of the client device.

12. The method of claim 8, further comprising:
fetching the filter logic upon loading of the client application.

13. The method of claim 12, wherein the fetching of the filter logic is based on release data associated with the filter logic.

14. The method of claim 13, wherein the release data is used to verify whether the filter logic is a latest versions.

15. A non-transitory computer-readable storage medium storing a set of instructions that, when executed by one or more computer processors, causes the one or more computer processor to perform operations, the operations comprising:
accessing a data set from a buffer on a client device, the data set representing one or more signals of the client device, the client device including a collection module, an orchestrator module, the buffer, and a tracking plan monitor, the collection module capturing one or more user actions and passing the one or more user actions to the buffer as the one or more signals of the client device;
qualifying, using the tracking plan monitor, the one or more signals as one or more events, the qualifying including passing the one or more signals through a filter logic, the filter logic being configured to qualify the one or more signals as the one or more events based on a value or relevancy of one or more data points included in the one or more signals, the filter logic having been developed outside of a client application of the client device and loaded into the client application without rebuilding the client application, the orchestrator module keeping the client device in synchronization with a developer console for a latest version of the filter logic; and
passing the one or more events through a chain of middleware built into an analytics library to enrich the one or more events, each middleware in the chain of middleware including a function runtime, the function runtime providing an operating environment in which an edge function is implemented within each middleware.

16. The non-transitory computer-readable storage medium of claim 15, wherein the filter logic is deployed to the client application over-the-air.

17. The non-transitory computer-readable storage medium of claim 15, wherein the filter logic is deployed to the client application in real time.

18. The non-transitory computer-readable storage medium of claim 15, wherein the one or more signals are passed through a plurality of filter logic, the plurality of filter logic having been developed outside of the client application of the client device and loaded into the client application without rebuilding the client application, and wherein the plurality of filter logic are written in a single language and the client application includes infrastructure that ensures the plurality of filter logic are executable independently of a platform of the client device.

19. The non-transitory computer-readable storage medium of claim 15, the operations further comprising:
fetching the filter logic upon loading of the client application.

20. The non-transitory computer-readable storage medium of claim 19, wherein the fetching of the filter logic is based on release data associated with the filter logic.

* * * * *